United States Patent [19]

Hritz

[11] 4,292,015
[45] Sep. 29, 1981

[54] APPARATUS FOR ROTATIONAL MOLDING

[76] Inventor: Michael Hritz, 7463 Julia Dr., North Royalton, Ohio 44133

[21] Appl. No.: 19,836

[22] Filed: Mar. 12, 1979

[51] Int. Cl.³ .............................................. B29C 5/04
[52] U.S. Cl. .................................... 425/73; 425/162; 425/429; 425/430
[58] Field of Search .................. 425/429, 430, 73, 162

[56] References Cited

U.S. PATENT DOCUMENTS

| | | | |
|---|---|---|---|
| 2,624,072 | 1/1953 | Delacoste et al. | 425/430 |
| 2,659,107 | 11/1953 | DeBell | 425/429 |
| 3,172,160 | 3/1965 | Woodhouse | 425/429 |
| 3,202,745 | 8/1965 | Ringdal | 425/429 |

FOREIGN PATENT DOCUMENTS 842347 7/1960 United Kingdom ................ 425/429

*Primary Examiner*—James H. Derrington
*Attorney, Agent, or Firm*—Fay & Sharpe

[57] ABSTRACT

A method and apparatus for the rotational molding of thin-walled articles. The method is comprised of the steps of introducing a predetermined amount of plastic material into a mold, rotating the mold about a first axis at a predetermined speed, while simultaneously rocking the mold through a selective arc about a second axis which is normal to the first axis, heating the mold for curing the plastic material during the rotation and rocking, and cooling the mold and plastic material whereby the plastic material is molded to form a thin-walled object in conformance with the interior surface of the mold. The rotational molding apparatus is comprised of a heat insulating housing comprising a bottom half and a top half which may be disassociated for access to the interior of the housing. The interior of the housing contains a first frame which may be rocked about a first axis and a second mold-carrying frame which is attached to the first frame and rotates about a second axis normal to the first axis. Motors mounted exterior of the housing and operably connected to each of the frames cause the rotation and rocking of the frames. A heat source introduces heated air to the interior of the housing for purposes of curing plastic material held in a mold mounted in the apparatus.

14 Claims, 10 Drawing Figures

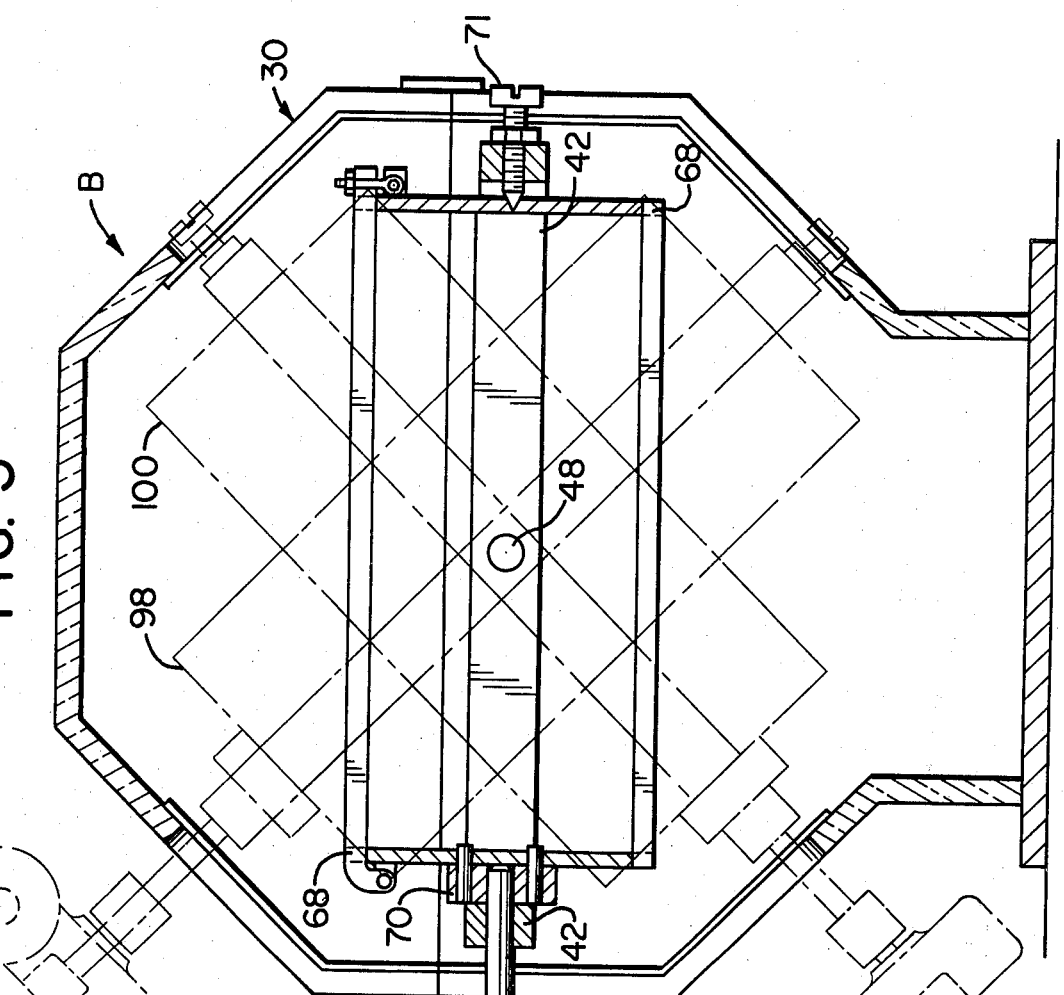
FIG. 3
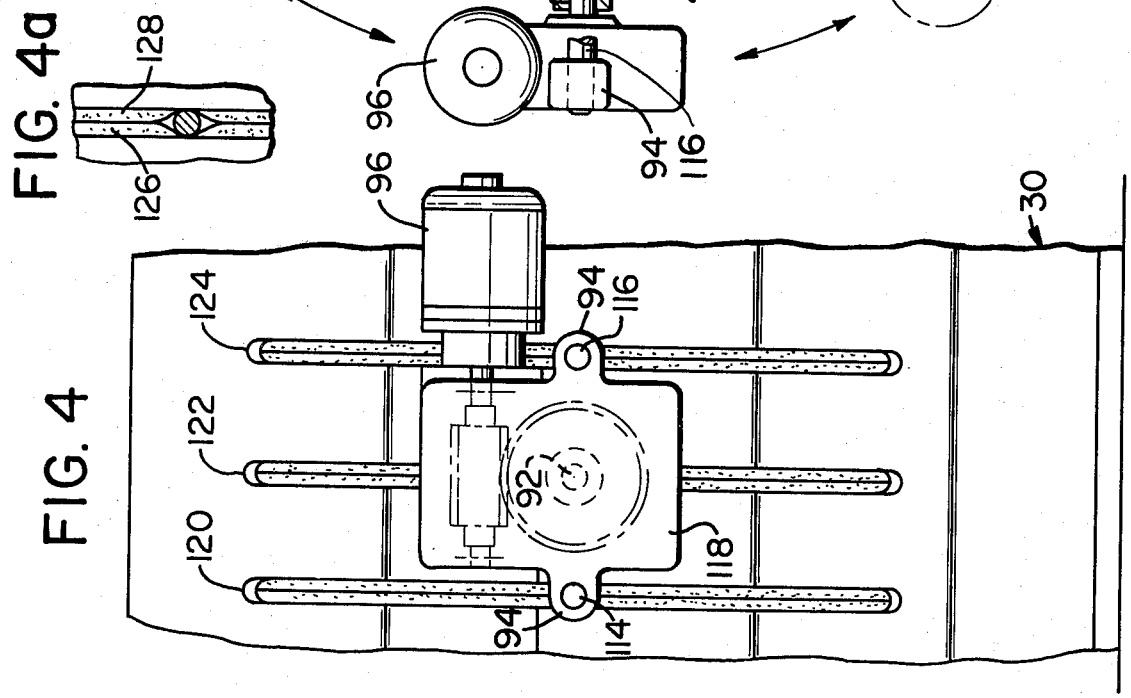
FIG. 4a
FIG. 4

APPARATUS FOR ROTATIONAL MOLDING

BACKGROUND OF THE INVENTION

This invention pertains to the art of rotational molding or casting and more particularly to a method and apparatus for the rotational molding or casting of thin walled items.

The invention is particularly applicable to a rotational molding machine for the manufacture of thin walled or hollow items shaped in conformance with a mold. However, it will be appreciated to those skilled in the art that the invention could be readily adapted for use in other environments as, for example, where similar methods or apparatus are employed to manufacture items.

Numerous types of apparatus and methods for molding thin walled articles are known in the art. A common rotational molding machine is one which fixedly mounts a plurality of mold carrying arms on a turret which rotates to move the arms from one operating station to another. At the operating stations the molds on the arms are loaded with a thermoplastic or like material, rotated and heated in an oven chamber, and cooled at a cooling station. During rotation and heating, the mold is typically rotated about two axes normal to each other.

The deficiencies found in these types of rotational molding machines are such that the machines themselves are of limited economic and practical value due to a number of inherent problems. A principal problem is cost and size. The complexity of a machine which must carry a plurality of arms on a turret through different operating stations has produced an apparatus which is excessively costly to manufacture and maintain. In addition, the physical size of the apparatus requires a great amount of factory space.

An additional problem in prior rotational molding machines has been the extremely short life span of bearings which support the mold carrying arms. In prior art machines when a mold is being rotated about two normal axes and heated, the bearings have been in the oven chamber or heating station. Likewise, when the mold is cooled. Such temperature changes have had an extremely debilitating effect on the bearings.

A further problem in prior rotational molding machines has been the difficulties with mold loading, mounting and removal. A mold must be loaded with plastic material and then mounted on a turret arm. Where a plurality of turret arms are involved, loading, mounting and removal of molds has been particularly time consuming and inefficient.

The present invention contemplates a new and improved apparatus and method which overcomes all of the above referred to problems and others to provide a new apparatus and method for rotational molding which is simple in design, economical to manufacture, readily adaptable to a plurality of uses with molds having a variety of dimensional characteristics, easy to install, easy to maintain and which provides improved molded articles.

BRIEF SUMMARY OF THE INVENTION

In accordance with the present invention, there is provided an apparatus and method for rotational molding or casting of materials comprising an outer housing including a first portion and second portion is cooperation with each other to define a selectively disassociable arrangement. A first frame is mounted in the housing for rocking about a first axis. A second frame is also mounted in the housing for rotation about a second axis transverse to the first axis. Both frames are driven by variable speed motors. A heat source is connected with the housing whereby material in a mold mounted in the rotational molding apparatus is rotationally molded to form a thin walled product.

The method of the invention includes the steps of rotating a mold containing a predetermined amount of plastic material about a first axis while simultaneously rocking the mold through a selective arc about a second axis which is normal to the first axis.

In accordance with another aspect of the present invention, motors which rotate and rock the respective frames are mounted exteriorly of the housing.

In accordance with a further aspect of the present invention, the requirements for a plurality of stations for loading, rotating and heating, and cooling have been obviated.

In accordance with a more limited aspect of the present invention, the rocking frame selectively rocks through a predetermined arc ranging between zero and ninety degrees.

In accordance with yet another more limited aspect of the present invention, the upper portion of the housing of the rotational molding apparatus includes a flexible vent adapted to allow the egress of heated air.

In accordance with another aspect of the present invention, the molds are carried in a mold support apparatus which is easily installed and removed from the rotational molding machine and is adapted to carry a plurality of molds of a variety of dimensions.

One benefit obtained by use of the present invention is a method and apparatus for rotational molding which has the capability of manufacturing thin walled articles which have a variable wall thickness.

Another benefit obtained from the present invention is a rotational molding apparatus which substantially reduces maintenance costs and the space requirements of prior art rotational molding machines.

A further benefit of the present invention is improved efficiency in the manufacture of thin walled articles due to the ease of loading, installation and removal of molds and the mold carrying apparatus during the steps comprising the manufacture of a rotationally molded article.

Other benefits and advantages for the subject new method and apparatus for rotational molding will become apparent to those skilled in the art upon a reading and understanding of this specification.

BRIEF DESCRIPTION OF THE DRAWINGS

The invention may take physical form in certain parts and arrangements of parts and in certain steps and arrangement of steps, the preferred and alternate embodiments of which will be described in detail in this specification and illustrated in the accompanying drawings which form a part hereof and wherein:

FIG. 3 is a cross-sectional view of the apparatus depicted in FIG. 2 showing the apparatus in selected rocked positions;

FIG. 4 is a partial, side plan view of the apparatus depicted in FIG. 2 showing a drive motor and the means for mounting the motor;

FIG. 4A in an enlarged, partial cross-sectional view taken along line 4a—4a of FIG. 3.

DETAILED DESCRIPTION OF THE INVENTION

Figure 1:
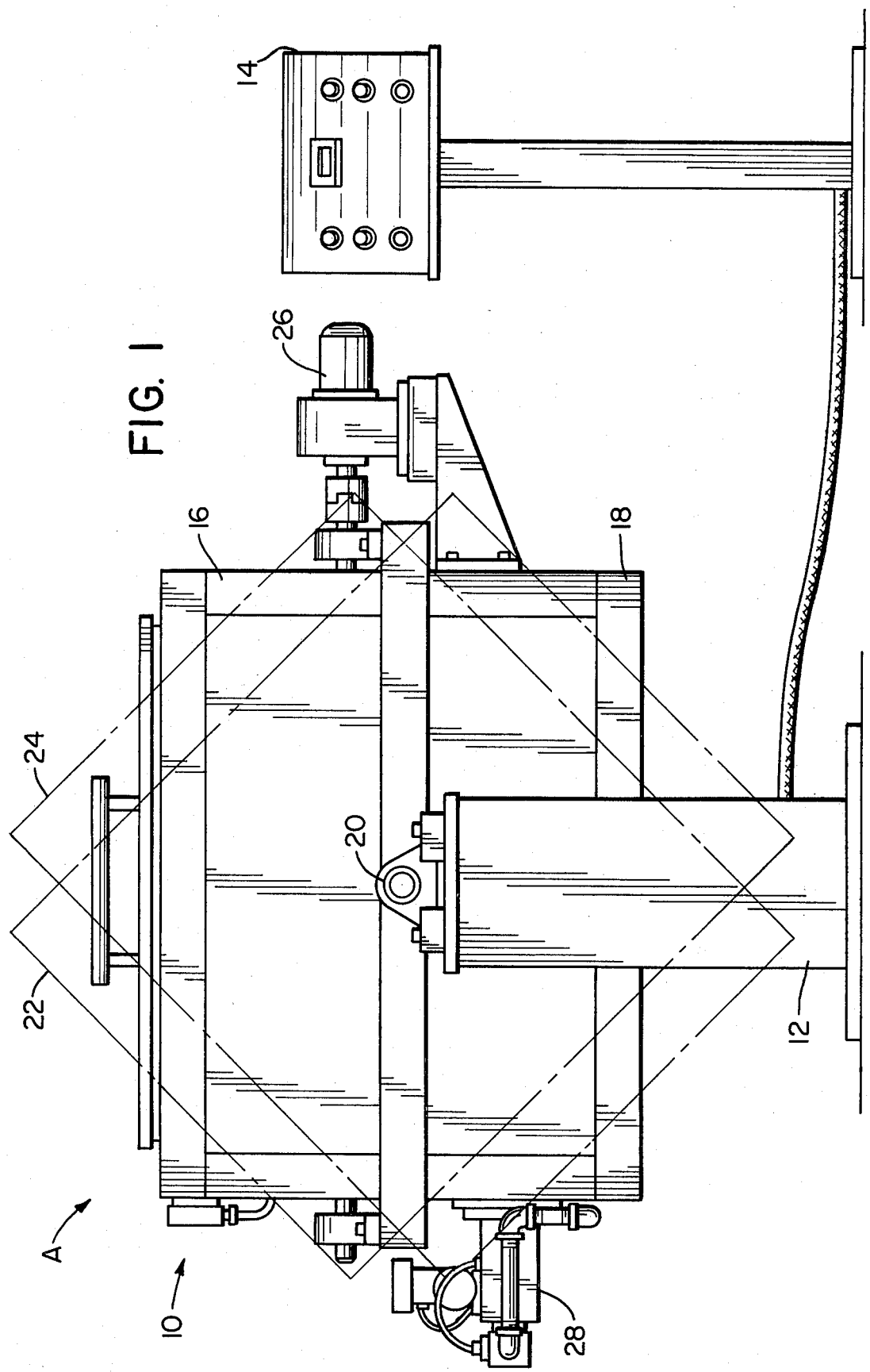
FIG. 1 is a front plan view of an alternate embodiment of the rotational molding apparatus formed in accordance with the present invention.

Referring now to the drawings wherein the showings are for purposes of illustrating the preferred and alternative embodiments of the invention only, and not for purposes of limiting same, FIG. 1 shows an alternate embodiment of a rotational molding apparatus A comprising an outer housing 10 mounted on a fixed support 12 and a control unit 14. The housing 10 is comprised of an upper portion 16 and a lower portion 18. Upper portion 16 is selectively disassociable from lower portion 18 for purposes of ready access to the inner areas of housing 10 for the loading and unloading of molds and mold-carrying apparatus. Housing 10 selectively rocks about an axis at bearing 20 with an arc range of approximately 90 degrees. Dash lines 22 and 24 of FIG. 1 show the housing 10 rocked at opposing 45 degree angles from the horizontal. Drive means are contained in support 12 for selectively rocking housing 10. Molds are carried in the apparatus in the inner portions of housing 10 on a mold supporting apparatus connected to variable speed rotating motor drive 26. Heat is introduced into the inner areas of housing 10 for curing plastic material contained in the molds by gas heater 28. The pitch and speed of the rocking movement, the speed of rotation of the mold turning apparatus, and the rate of heating of the inner areas of the housing 10 are all controlled by control unit 14.

Figure 2:
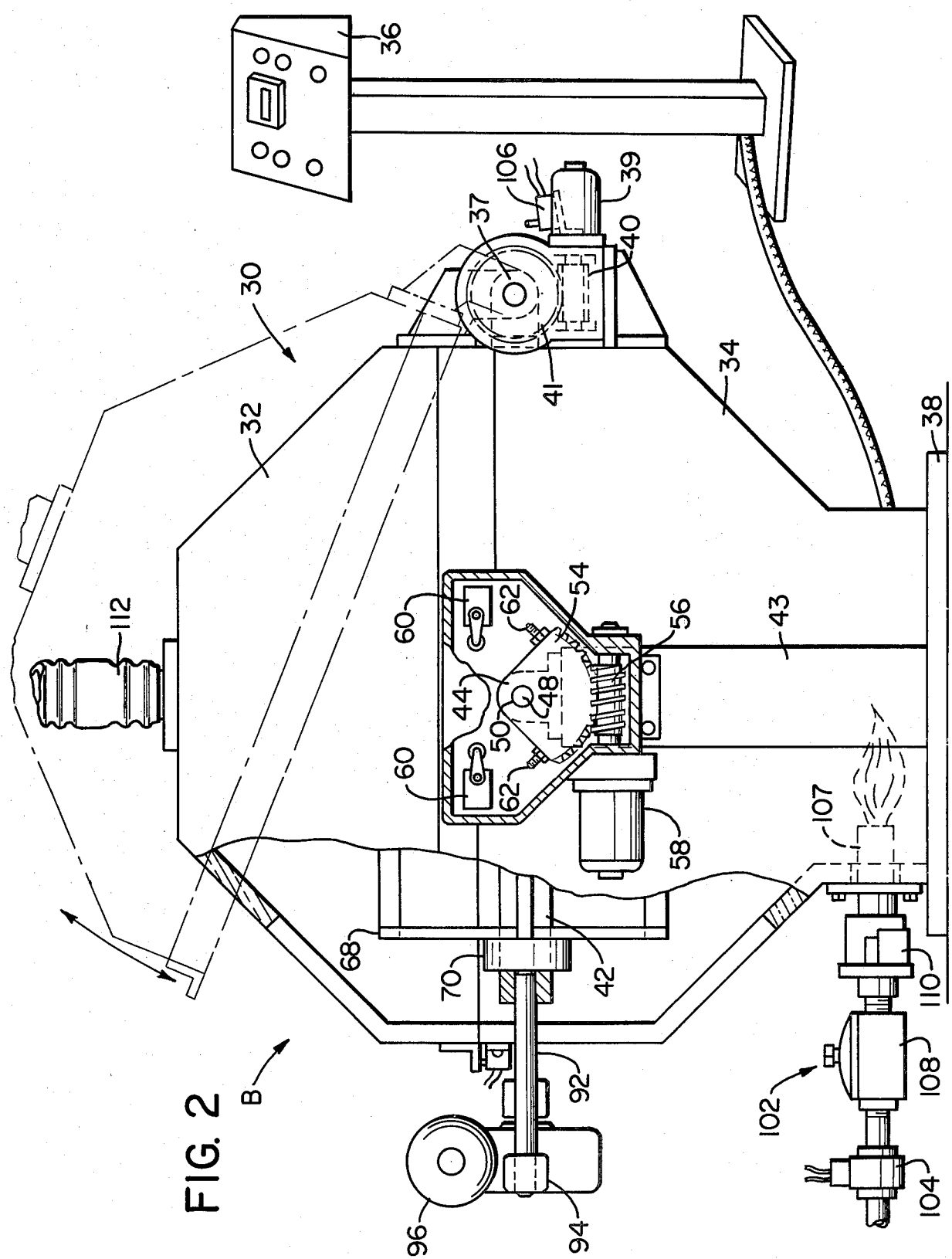
FIG. 2 is a front plan view of the preferred embodiment of the present invention shown partially in section.

With reference to FIG. 2, the preferred embodiment of the rotational molding apparatus embodying the invention is shown. The rotational molding apparatus B includes an outer casing 30 constructed of heat insulating material and is comprised of an upper portion 32 and a lower portion 34. Control unit 36 controls the operation of rotational molding apparatus B.

The lower portion 34 of casing 30 is fixed to support base 38 while upper portion 32 is selectively arcuately disassociable from lower portion 34 through rotation about pivot connector 37. Drive motor 39 and gears 40, 41, which are rigidly affixed to lower portion 34, operate the opening and closing of upper portion 32 and are controlled by control unit 36.

Figure 5:
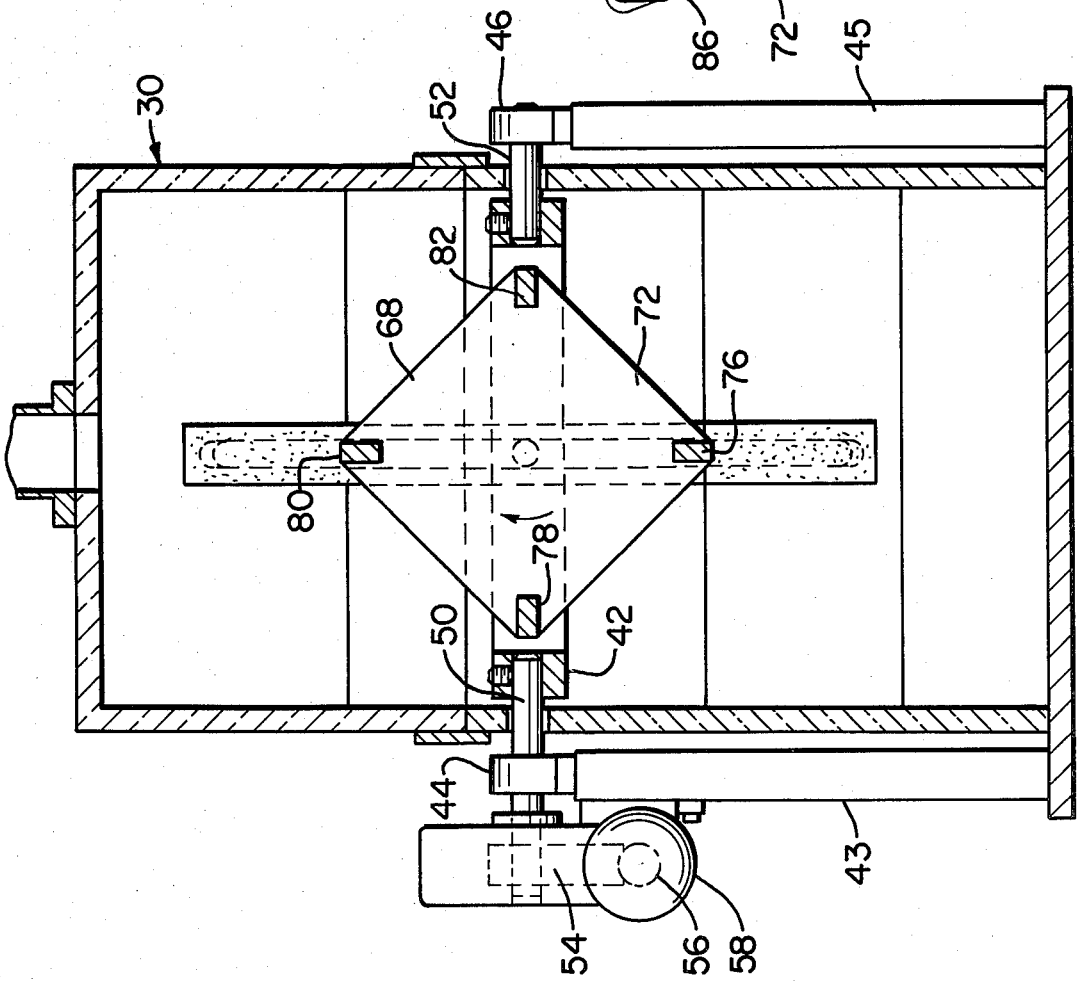
FIG. 5 is a side cross-sectional view of the apparatus depicted in FIG. 2 showing a mounted mold carrying apparatus.

With reference to FIGS. 2, 3 and 5, casing 30 contains a first frame 42 generally disposed horizontal at rest and pivotally attached to support members 43, 45 at opposing bearing members 44, 46 for rocking frame 42 about an axis 48. Frame 42 is connected to bearing members 44, 46 by shafts 50, 52 respectively. Shaft 50 is fixedly attached to quadrant gear 54 which is driven by worm gear 56 and variable speed motor 58. The extent of the pitch in the rocking action of frame 42 is selectively controlled by adjustment of the positions of limit switches 60 and limit switch actuator members 62. The speed of rocking action is selectively controlled by varying the speed of motor 58 through associated controls in control unit 36 and typically has a speed ranging from two to twenty cycles per minute.

With particular reference to FIG. 5 it can be seen that bearing members 44, 46, motor 58, and gears 54, 56, are all mounted exteriorly of casing 30 and are fixedly attached to support members 43, 45.

The action of the first frame 42 is to selectively rock about a first axis 48 at a variable speed in a predetermined arc ranging from zero to ninety degrees; although if desired the rocking action may be completely eliminated during rotational molding. Numerous types of conventional controls for producing such a rocking action are known in the art. The controls disclosed in the preferred embodiment are only one means of obtaining such action.

With reference to FIGS. 2, 3 and 5, casing 30 contains a second frame 68 for carrying molds. Frame 68 is fixedly attached to first frame 42 by opposed attachment means 70 and 71. Attachment means 70 and 71 may comprise any conventional attachment devices which provide for quick and easy attachment and disattachment of the frame.

Figure 6:
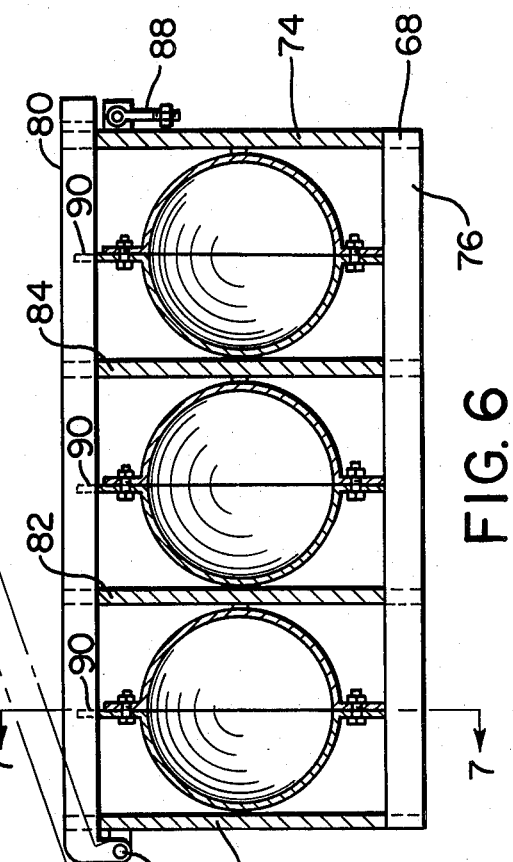
FIG. 6 is a front plan view of a mold carrying apparatus containing three molds.

With particular reference to FIGS. 5 and 6 it may be seen that frame 68 comprises two opposed end members 72, 74 with four support members 76, 78, 80 and 82 extending between end members 72, 74 at spaced intervals. Frame 68 is disclosed as having two removable and adjustable segregating members 82, 84 to provide for three mold carrying compartments in frame 68. Any number of segregating members could be used to provide for a plurality of mold carrying compartments, or none may be used to provide for a single large compartment.

With particular reference to FIG. 6, it may be seen that support member 80 is selectively and arcuately disassociable from frame 68 through rotation about pivot connection 86. Support member 80 may be rigidly affixed to frame 68 by locking means 88 to provide for fixed containment of molds in frame 68. Support member 80 contains a plurality of recesses 90 adapted to receive a portion of the edges of the molds in the frame 68 to further fixedly contain the molds.

With particular reference to FIGS. 2 and 3, attachment means 70 is fixedly attached to shaft 92. Shaft 92 is fixedly attached to gear member 94 and variable speed motor drive 96. Variable speed motor drive 96 operates to rotate frame 68 on an axis normal to axis 48 and at predetermined speed typically ranging between four and twenty revolutions per minute and is operated by means of control unit 36. Variable speed motor drive 96 and gear member 94 are mounted exteriorly of casing 30.

With reference to FIG. 3 it may be seen that the rotational molding apparatus B operates to rock frame 42 between the arcuate positions designated by dashed lines 98 and 100, while simultaneously rotating second frame 68 about an axis normal to the rocking axis 48.

With reference to FIG. 2, an apparatus 102 for introducing heat into the casing for heating and curing plastic material contained in a mold during rotational molding comprises a safety solenoid 104 which is connected to limit switch 106 to provide for automatic shutoff of gas to burner 107 when the upper portion 32 of the casing 30 is open, a conventional pressure controlled diaphragm 108 and an air inlet 110. The egress of heated air from the casing 30 is provided by means of flexible vent 112.

With reference to FIG. 4, shafts 114 and 116 are fixedly attached to support plate 118 for motor drive 96. Shafts 114 and 116 are support members which are fixedly attached to frame 42 to provide a fixed support against the torque force applied to shaft 92 by means of gear member 94 and motor drive 96. Longitudinal slots 120, 122 and 124 of casing 30 allow movement of shafts 114, 92 and 116 through their rocking arc.

With particular reference to FIG. 4A which is taken along line 4a—4a depicted in FIG. 3, it may be seen how the longitudinal slots 120, 122, 124 are sealed around the shafts 114, 92, 116, respectively to prevent the undesirable egress of heated air. Opposing flexible asbestos type skirtings 126 and 128 operate to allow the easy movement of the shaft along the slot by giving away as the shaft moves along the slot, yet returning to an abutting sealing association after the shaft has passed.

Figure 7:
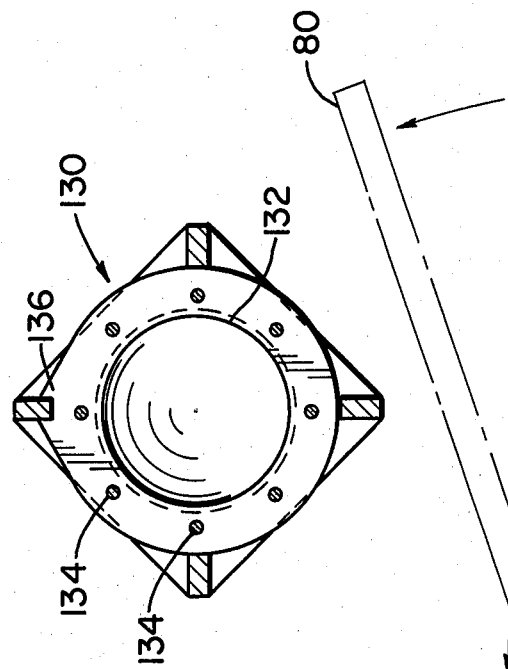
FIG. 7 is a cross-sectional view of a mold depicted in FIG. 6 taken along line 7—7.

With reference to FIGS. 6 and 7, a mold 130 with a spherical inner portion 132 is shown. Such a mold could be used for the production of hollow balls or the like, such as basketballs. The mold 130 is typically constructed of aluminum and is generally comprised of two distinct parts which are affixed together and sealed by conventional attachment means such as a plurality of bolts and nuts or camming members through associated cylindrical openings 134. One edge of the mold 130, such as at edge 136, is adapted to be closely received in associated recess 90 in support member 80 of frame 68.

Figure 8:
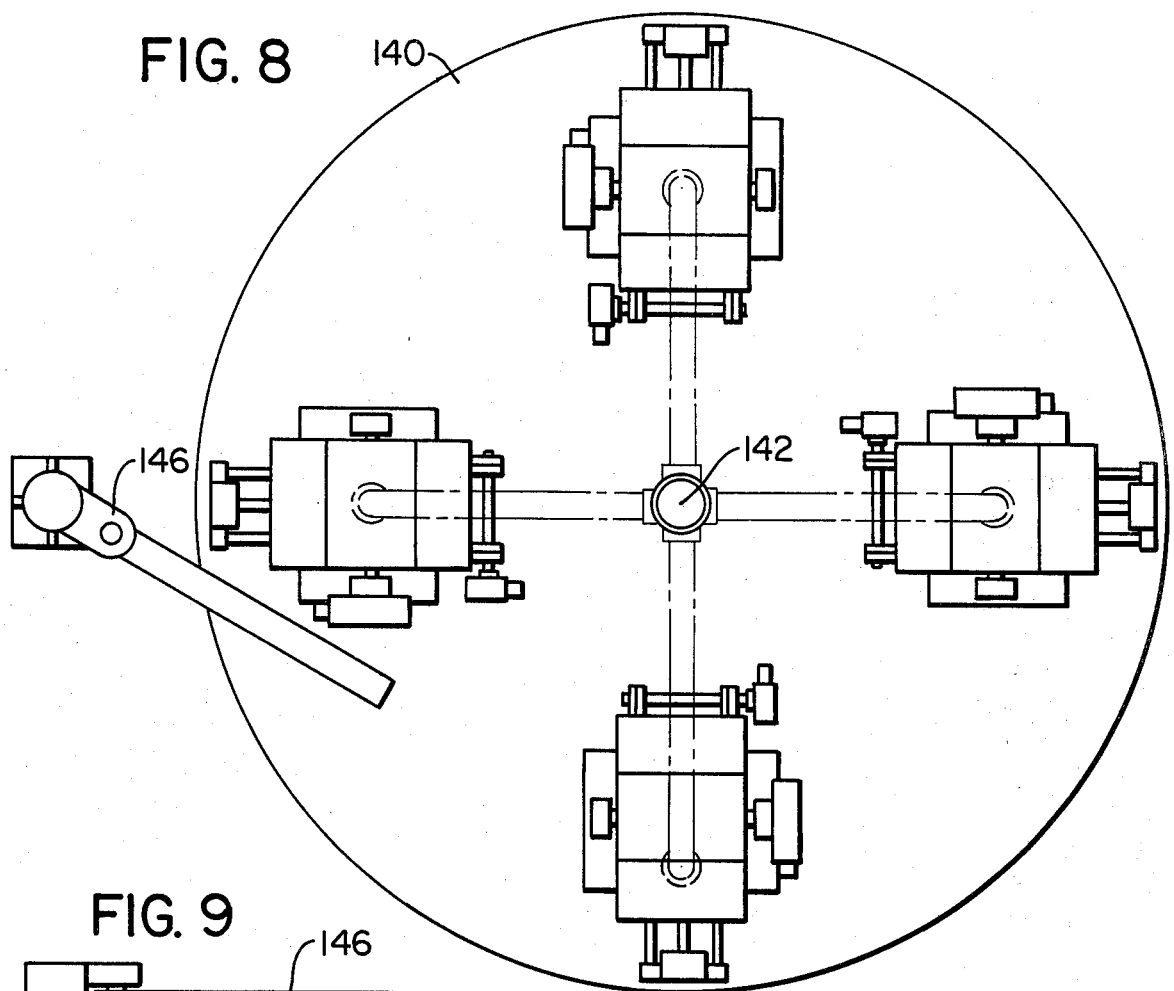
FIG. 8 is a top plan view of a plurality of rotational molding apparatus formed in accordance with the present invention shown in a carousel type arrangement.
Figure 9:
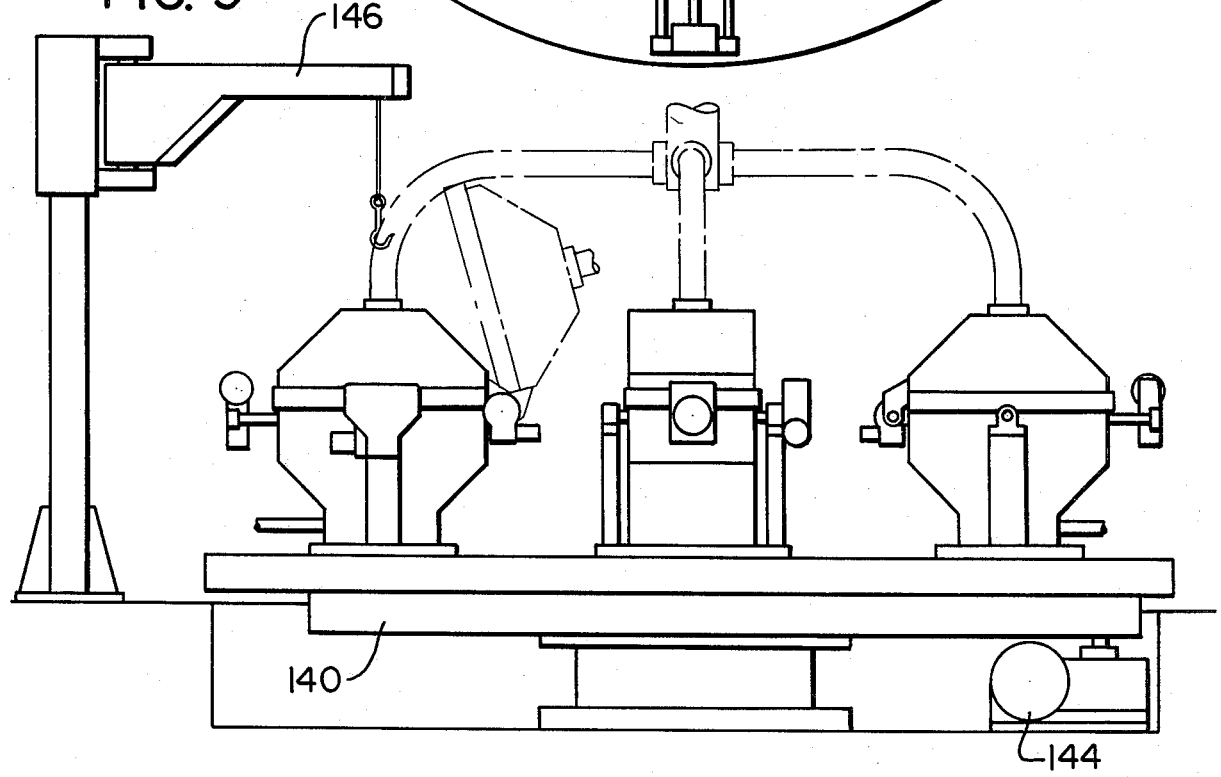
FIG. 9 is a side plan view of the arrangement depicted in FIG. 8.

FIGS. 8 and 9 show a carousel type arrangement of a plurality of rotational molding machines embodying the invention. In such an arrangement the carousel 140 rotates about an axis 142 by means of drive motor 144. Overhead hoist 146 is utilized to load and unload molds or mold carrying apparatus.

METHOD AND OPERATION

With particular attention to FIGS. 3 and 6, the improved rotational molding characteristics of the new rotational molding apparatus will be specifically discussed.

The invention can be used to mold anything that will set under heat, generally thermoplastics, plastisols, or polyethylene type materials. The invention can also be used to mold common molding resins such as epoxies, acrylics, or polyesters, where catalysts may be used instead of heat. A predetermined amount of plastic material in either liquid or powder form is placed in a mold. A mold is generally constructed of aluminum, comprised of two halves, and sealed by screws or cams. A silicon type spray is generally used to coat the inner surfaces of the molds in order to inhibit adhesion of the plastic materials to the surface during heating.

After the insertion of the plastic materials, the mold is then loaded in the mold carrying frame 68 and tightly secured therein. The entire loading operation will require approximately one minute per mold.

The mold carrying frame 68 may or may not be attached to the mold carrying apparatus B at the time of the loading of the molds. After the loaded molds and mold carrying frame 68 have been securely attached in the rotational molding apparatus casing 30, and the casing 30 has been heat sealed, the molding and curing of the plastic material to form a thin walled object in conformance with the interior of the mold is ready to begin. Molding entails rocking about a first axis 48 in an arcuate pitch ranging between zero and ninety degrees and a rocking speed ranging between two and twenty cycles per minute. Simultaneous rotation about a second axis normal to the first axis 48 also occurs. The rotation speed has a range between four and twenty revolutions per minute. While the simultaneous rocking and rotating action is occurring, heat is introduced into the mold carrying apparatus casing by heating means 102 (FIG. 2) for purposes of curing the plastic material. Although the necessary temperature is dependent upon the plastic materials to be molded, the air temperature of the heated air introduced into the casing 30 is approximately 1,000 degrees Fahrenheit and a common mold temperature for curing is approximately 300 degrees Fahrenheit. The curing time may typically range from two to ten minutes with typically five to six minutes curing time necessary to obtain $\frac{1}{8}$ of an inch wall thickness in the molded article.

If desired, the rocking action may be eliminated during molding entirely, resulting in only a rotating action of the mold carrying frame 68. Mere rotating action is desired in casting of hollow articles such as pipe or tubing.

A particular advantage of the invention includes the attainment of variable wall thicknesses in a molded article due to the independently controlled rotation and rocking action. For example, where a canoe is to be rotationally molded which requires greater structural strength in central portions of the canoe as opposed to the end portions, dwelling the mold carrying apparatus in a substantially horizontal position for a longer time during the rocking action will result in a thicker wall thickness in the central portions of the canoe.

After the curing time has elapsed, the casing 30 is opened and either the molds or the mold carrying frame 68 is removed from the rotational molding apparatus B. The next step comprises quenching of the molds, typically in a liquid bath, in order to cool the plastic materials in the molds.

Another particular advantage of the present invention includes increased efficiency in rotational molding since the quenching operation is performed apart from the heating operation. For example, a mold carrying frame 68 containing cured molds may be removed by means of a hoist from the mold carrying apparatus B and loaded into a quenching bath, while another mold carrying frame may be immediately thereafter loaded into the mold carrying apparatus for curing of the molds, which in turn may then be unloaded and quenched and a third frame loaded, and so on. The speed of the operation will be limited by the curing time and not by the loading of the plastic materials into the molds nor the quenching of the molds.

With reference to FIGS. 8 and 9, this assembly line type of manufacture may be most advantageously realized in a carousel operation where a plurality of rotational molding machines may be loaded, heated and cured, and unloaded for quenching, all on a sequential basis. That is to say a machine may be loaded and thereafter heated and cured while other machines are loaded.

The invention has been described with reference to the preferred embodiment. Obviously, modifications and alterations will occur to others upon the reading and understanding of the specification. It is my intention to include all such modifications and alterations insofar as they come within the scope of the appended claims or the equivalents thereof.

What is claimed is:

1. An apparatus for the rotational molding of materials, said apparatus comprising:
   an outer housing constructed from heat insulating material, said housing including a first portion and a second portion in cooperation with each other to define a selectively disassociable arrangement;
   a first frame substantially contained in said housing and mounted on bearing members exterior of said housing for selective rocking through a predetermined arc about a first axis;
   a second frame substantially contained in said housing and mounted to said first frame for rotation about a second axis transverse to said first axis;
   at least one mold mounted in said apparatus;
   means for mounting said mold in said apparatus;
   means for rocking said first frame in selective reciprocating arcuate cycles;
   means for rotatably driving said second frame at predetermined speeds independently operable from said means for rocking said first frame; and
   a source of heat communicating with the interior of said housing whereby material in said mold is rotationally molded to form a thin-walled product.

2. The apparatus as defined in claim 1 wherein said first frame selectively rocks through a predetermined arc ranging between 0 and 90 degrees.

3. The apparatus as defined in claim 1 wherein said means for rocking said first frame is mounted exteriorly of said housing.

4. The apparatus as defined in claim 1 wherein said means for rotatably driving said second frame is mounted exteriorly of said housing.

5. The apparatus as defined in claim 4 wherein said housing includes longitudinal wall openings extending at least through an arc greater than 90 degrees.

6. The apparatus as defined in claim 5 wherein said wall openings include flexible skirtings adapted to generally heat seal said housing.

7. The apparatus as defined in claim 6 wherein said skirtings comprise asbestos-type material.

8. The apparatus as defined in claim 1 wherein said housing includes a vent adapted to allow the egress of heated air.

9. The apparatus as defined in claim 1 wherein a control panel for controlling said rocking and said rotatably driving is mounted apart from said apparatus.

10. The apparatus as defined in claim 1 wherein said first frame includes means adapted to fixedly receive said second frame.

11. The apparatus as defined in claim 10 wherein said second frame is fixedly attached to said first frame.

12. The apparatus as defined in claim 1 wherein said second frame includes a plurality of segregating members adapted to partition said second frame for receiving and fixedly containing a plurality of molds.

13. An apparatus for the rotational molding of plastic materials comprising:
    an outer casing constructed from rigid heat insulating material, said casing including an upper and a lower half, said lower half being rigidly affixed by a plurality of fixed support members positioned exteriorly of said casing, said upper half being in movable cooperative association with said lower half for selective sealing and access to the inner portions of said casing;
    a frame journaled to said fixed support members and mounted in said casing for selective rotation through predetermined reciprocating arcuate cycles about a first axis;
    at least one mold mounted in said apparatus;
    means to carry at least one mold journal mounted on said frame for rotation about a second axis normal to said first axis;
    a first drive means for rocking said frame at predetermined speeds in selective reciprocating arcuate cycles about said first axis;
    a second drive means, independently operable from said first drive means, for rotating said second drive means to carry said mold at predetermined speeds about said second axis; and
    means for introducing heated air to the interior of said casing whereby plastic materials introduced into said mold mounted in said apparatus are rotationally molded and cured to form a thin-walled item.

14. The apparatus as defined in claim 13 wherein said frame selectively rocks through a predetermined arc ranging between 0 to 90 degrees.

* * * * *